United States Patent [19]
Endres

[11] 3,757,347
[45] Sept. 4, 1973

[54] INSTRUMENT FOR MECHANICALLY RECORDING STRAINS

[75] Inventor: Thomas E. Endres, Kettering, Ohio

[73] Assignee: Technology Incorporated, Dayton, Ohio

[22] Filed: May 24, 1972

[21] Appl. No.: 256,344

Related U.S. Application Data

[63] Continuation-in-part of Ser. No. 169,927, Aug. 9, 1971.

[52] U.S. Cl. ................................. 346/7, 346/137
[51] Int. Cl. ............................................. G01d 15/02
[58] Field of Search....................... 346/7, 137, 145

[56] References Cited
UNITED STATES PATENTS

| | | | |
|---|---|---|---|
| 2,932,967 | 4/1960 | Prewitt et al. | 73/88 R |
| 3,430,250 | 2/1969 | Prewitt et al. | 346/7 |

*Primary Examiner*—Joseph W. Hartary
*Attorney*—William R. Jacox et al.

[57] ABSTRACT

An annular recording target is rotatably supported by an element which is secured to a first base plate adapted to be attached to a member being monitored for strains. A recording stylus is supported in contact with the target by another spring element which is secured to a second base plate also adapted to be attached to the member being monitored. The stylus moves radially relative to the target in response to linear movement between the base plates, and an actuating mechanism rotates or indexes the target in response to relative linear movement between the base plates. The actuating mechanism includes diametrically opposed sets of inclined spring fingers which are supported by a cover member hinged to the second base plate and pivotable between an open position and a closed position overlying the target and the stylus. The cover member is retained in its closed position by a latch spring which also serves to retain the target on the support element until the cover member is closed. In a modification, the cover member is sealed to the base plates by a resilient foam material.

18 Claims, 6 Drawing Figures

PATENTED SEP 4 1973 3,757,347

INSTRUMENT FOR MECHANICALLY RECORDING STRAINS

RELATED APPLICATIONS

This application is a continuation-in-part of pending application Ser. No. 169,927, filed Aug. 9, 1971 and which is assigned to the assignee of the present invention.

BACKGROUND OF THE INVENTION

In an instrument for mechanically recording the strains of a member when it is subjected to changing stresses, such as the instruments disclosed in U.S. Pat. Nos. 2,081,579 and No. 3,430,250, a circular disc-like recording target is supported for rotation by a base plate which is secured or attached to one area of the member being monitored or tested. A scratch element or stylus is supported in engagement with the upper face of the target by an arm which extends from another base plate which is also secured to the member being monitored or tested. Relative movement of the two base plates effects radial movement of the stylus on the recording target, and progressive rotation of the target causes the stylus to record a mark corresponding to each strain resulting from changes in the stresses on the member or as a result of thermal expansion or contraction of the member.

As set forth in the above-mentioned patent application, it has been found desirable to provide for positive and precise advancement or indexing of the recording target as scratches are made on the target. As a result, the scratch lines or marks, which represent relative movement between portions of the member to which the instrument is attached, can be clearly distinguished. Thus the scratch lines representing compression or contraction of the member can be clearly distinguished from scratch lines representing tension or expansion of the member.

It has also been found desirable to provide for conveniently loading a recording target onto the strain recording instrument and to provide for conveniently unloading or removing the target after it has received the recorded strain information. In addition, it has been found desirable to provide for enclosing or covering the target after it is mounted on the instrument to protect the target from exposure to inadvertent minor impacts and/or to water, dust and other foreign particles in the surrounding air.

For example, the strain recording instrument may be mounted on a moving member such as the wing of an aircraft or on the blade of a helicopter rotor to record the strains resulting from flexing the wing or the rotor blade. The instrument may also be mounted on a stationary object such as a bridge or a building. During such use, the recording instrument may be exposed to extreme weather conditions and/or to a high velocity flow of air carrying foreign particles. The recording instrument may also be exposed to substantial changes in temperature which cause corresponding thermal expansion and contraction of the instrument. It is important that such an air flow or thermal expansion and contraction do not affect the precision operation of the recording instrument or distort the recorded strain information.

SUMMARY OF THE INVENTION

The present invention is directed to an improved mechanical strain recording instrument which provides the desirable features mentioned above, and particularly the features of convenient loading and unloading of a target, protection of a target after it has been mounted on the instrument and the feature of accurate and precise recording of strain information independent of substantial changes in temperature.

In accordance with one embodiment of the invention, a flat annular target is rotatably supported by a frusto-conical button which projects into the center hole of the target and is formed as part of a thin flexible leaf spring. A scratch element or stylus is supported under the target by another thin flexible spring which is rigidly secured or connected to a rear or second base plate. The target is temporarily retained on its support button by a spring wire latch element which is supported by guides mounted on the first base plate.

The latch element also serves to retain a protector cover member in its closed position extending over the target parallel to the base plates. The cover member is pivotally connected to the second base plate and is movable to an open position for loading and unloading a target. The cover member supports a set of spring actuating fingers which engage the upper face of the target when the cover member is pivoted to its closed position. In a manner similar to that disclosed in the above-mentioned application, the spring actuating fingers are effective to produce positive step-by-step rotation or advancement of the target in response to relative movement between the base plates which are attached to the member being monitored or tested for strain.

In another embodiment of the invention, strips of resilient foam material are located between the cover member and the base plates to provide a sealed enclosure for the target and prevent it from being exposed to dust, water and other foreign particles when the cover member is latched in its closed position. Other features and advantages of the invention will be apparent from the following description, the accompanying drawing and the appended claims.

DESCRIPTION OF THE PREFERRED EMBODIMENTS

Figure 1:
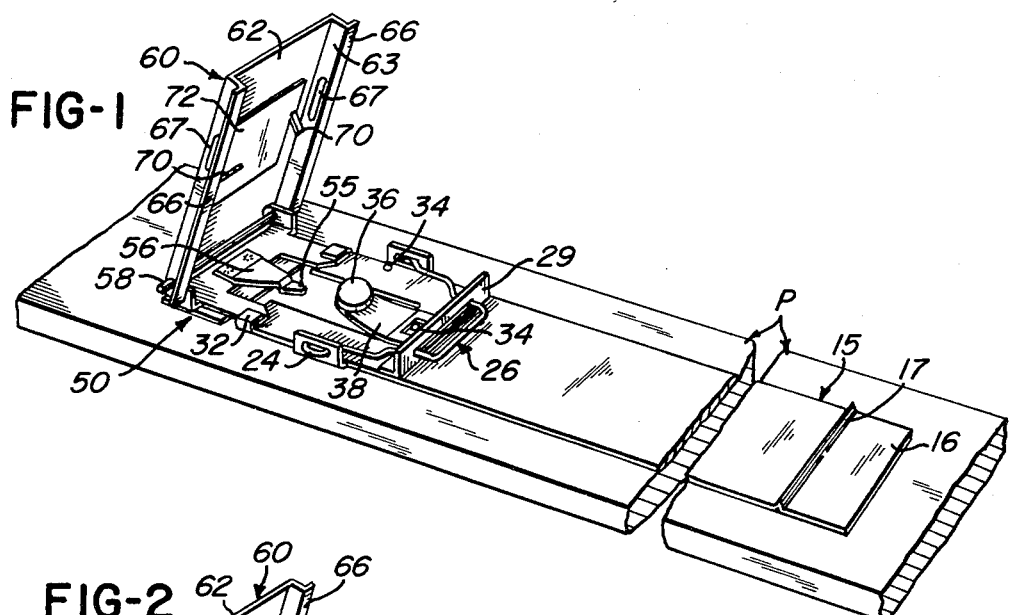
FIG. 1 is a perspective view of a recording instrument constructed in accordance with the present invention and shown mounted on a test member prior to receiving a target.
Figure 2:
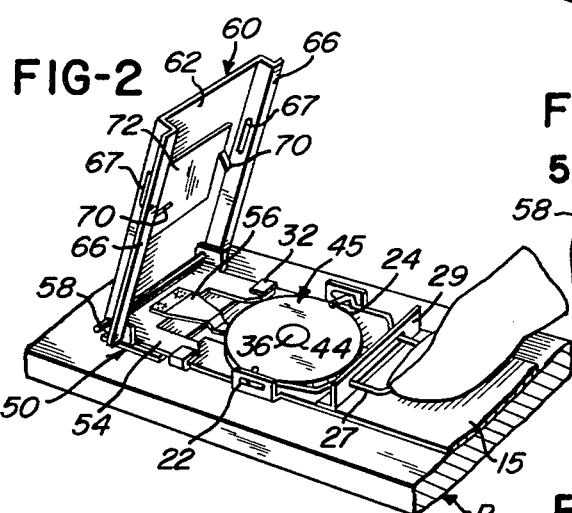
FIG. 2 is a fragmentary perspective view similar to FIG. 1 and illustrating the loading of a target into the instrument.
Figure 3:
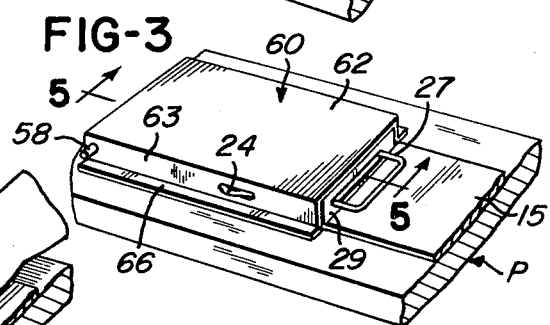
FIG. 3 is another fragmentary perspective view showing the cover member latched in its closed position after a target has been positioned within the instrument.

The assembled recording instrument shown in FIGS. 1-3 is adapted to record the strain history of a part or member being monitored or tested when the member is subjected to changes in stress such as by changes in tension and compression forces exerted on the member or when the member changes in dimensions due to thermal expansion and contraction. For purpose of illustration and simplification, the test member is shown in the form of an elongated metal test plate P.

Figure 4:
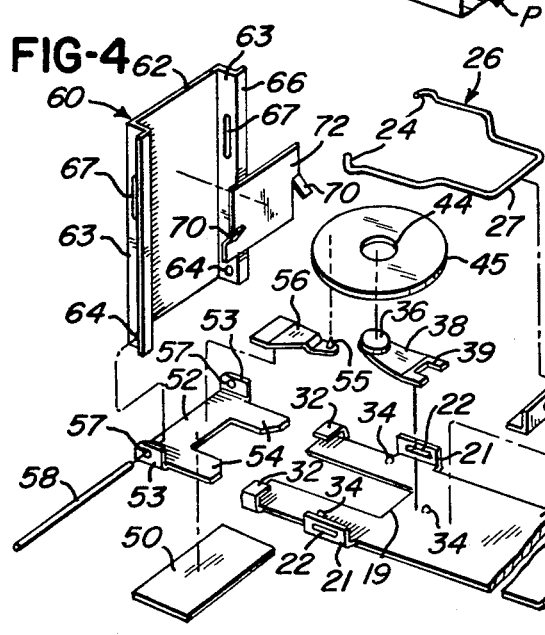
FIG. 4 is an exploded perspective view showing the components of the recording instrument illustrated in FIGS. 1-3.

Referring to FIGS. 1 and 4, the recording instrument includes an elongated generally rectangular forward or first base plate 15 which is preferably constructed of a non-corrosive metal such as stainless steel. The base plate 15 has one end portion 16 which is rigidly secured to the plate P by a suitable cement or a set of screws. An inverted V-shaped rib 17 is formed within the base plate 15 adjacent the end portion 16 to assure that the adhesive does not flow rearwardly or along the base plate 15 beyond the end portion 16.

A rectangular notch or slot 19 (FIG. 4) is formed within the opposite end portion of the base plate 15, and a pair of laterally spaced flanges or ears 21 project outwardly and upwardly in opposed parallel relation. Each of the flanges or ears 21 has a longitudinally extending slot 22 which receives and guides a corresponding V-shaped tip portion 24 of a generally U-shaped latch member 26 formed of a spring wire. The latch member 26 also includes a U-shaped handle portion 27 which projects through a slot 28 formed within an angular latch guide bracket 29 secured to the base plate 15 by spot welds (not shown).

The base plate 15 further includes a pair of tabs 32 which project upwardly and inwardly in opposed relation on opposite sides of the notch or slot 19 to define corresponding slots or narrow gaps. A set of three generally semi-spherical dimples or protrusions 34 (FIG. 4) are formed within the base plate 15 and project upwardly for defining a planar support surface. A frustoconical or tapered support member or button 36 is formed as an integral part of a thin leaf spring 38 having a thickness of approximately 0.003 inch. The opposite end portion of the spring 38 is secured by spot welds (not shown) to the base plate 15 adjacent the end of the slot 19 and has a notch 39 through which projects the adjacent protrusion 34.

Figure 5:
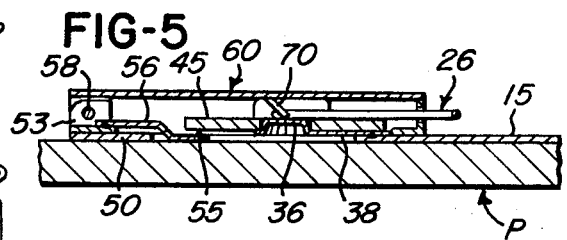
FIG. 5 is a fragmentary section taken generally on the line 5—5 of FIG. 3.

Referring to FIG. 5, the tapered button or support member 36 of the spring 38 is adapted to project into the center hole 44 of an annular washer-like tqrget 45. The target 45 is shown as being formed of sheet metal, but it may be formed of other materials as described in the above-mentioned patent application. The center hole 44 within the target 45 is formed slightly smaller than the larger base diameter of the support button 36 so that the target 45 positively seats on the button 36 without any lateral movement and the tapered button 36 will accommodate changes in size of the center hole 44 which result from thermal expansion and contraction of the target 45.

A rectangular rear or second base plate 50 (FIG. 4) is also secured to the test plate P by a suitable cement. The second base plate 50 supports a generally U-shaped hinge plate 52 having a p,ir of upwardly projecting ears 53 arranged in parallel-spaced opposed relation. The hinge plate 52 also includes a pair of forwardly projecting tabs 54 which overlie the corresponding rearwardly projecting portions of the base plate 15 and are retained within the gaps defined by the flanges 32 for sliding movement relative to the base plate 15. An upwardly projecting recording element or stylus 55 (FIG. 4), preferably formed of diamond, is supported by a thin leaf spring 56 secured to the hinge plate 52 by spot welds (not shown). The spring 56 has a thickness of approximately 0.003 inch and is adapted to flex when the target 45 is placed on the support button 36.

The upwardly projecting ears or flanges 53 of the hinge plate 52 are provided with aligned holes 57 for receiving a roll-type split hinge pin 58 which firmly engages the flanges 53 and pivotally supports a generally rectangular cover member 60. The cover member 60 includes a flat top wall 62 from which project parallel-spaced side walls 63 having aligned holes 64 for receiving the hinge pin 58 in tight fitting relation. A longitudinally extending flange 66 projects outwardly from each side wall 63, and a longitudinally extending slot 67 is formed within each of the side walls 63. The cover member 60 is pivotable between an open position (FIGS. 1 and 2) and a closed position (FIG. 3) where the cover member 60 is retained by the latch member 26 as will be explained later.

A pair of oppositely inclined or sloping actuating members or fingers 70 are formed as an integral part of a generally rectangular support plate 72 which is constructed from a thin sheet of stainless spring steel having a thickness of approximately 0.003 inch. The support plate 72 is rigidly secured to the inner surface of the cover member 60 by a set of spot welds (not shown), and the spring fingers 70 are arranged to engage the upper surface of the target 45 in diametrically spaced relation when the cover member 60 is pivoted to its closed position as shown in FIG. 5.

The mechanical strain recording instrument is used in the following manner. An annular target 45 is centered on the support button 36 and is depressed downwardly against the bias of the leaf springs 38 and 56 until the target rests upon the three projections 34. While the target is being held against the projections 34, the spring wire latch member 26 is pulled outwardly or forwardly as illustrated in FIG. 2 causing the inwardly projecting tips of the V-shaped portions 24 to be cammed inwardly by the forward ends of the slots 22. As the V-shaped portions 24 shift inwardly, the inner tips of the V-shaped portions 24 project over the upper face of the target 45 and are effective to retain the target against the upward force exerted by the leaf springs 38 and 56.

While the target 45 is being retained by retraction of the latch member 26, the cover member 60 is pivoted downwardly to its closed position (FIG. 3). The latch member 26 is then released so that the V-shaped portions 24 of the latch member 26 snap outwardly into the slots 67 within the side walls 63 of the cover member 60. This outward movement of the V-shaped portions 24 is effective to move the inwardly projecting opposing tips thereof out of engagement with the upper face of the target 45. When the cover member 60 is closed, the spring actuating pushers or fingers 70 (FIG. 5) firmly engage diametrically opposed positions of the upper face of the target 45 and are effective to hold the target 45 lightly in contact with the projections 34 and the stylus 55 which is biased upwardly against the lower or bottom face of the target by the leaf spring 56.

The operation of the mechanical strain recorder is substantially identical to the operation of the strain recorder disclosed in the above-mentioned application. That is, as the end portion 16 of the forward or first base plate 15 moves relative to the rear or second base plate 50 as a result of stresses exerted on the plate P or thermal expansion or contraction of the plate P, the stylus 55 marks or scratches the underneath face of the target 45 by moving in a radial direction relative to the target 45.

The relative movement between the base plates 15 and 50 also causes the spring actuating members or fingers 70 to rotate or index the target 45 in an incremental step-by-step manner. For example, when the base plates separate further, in response to a tension force applied to the plate P, the right spring finger 70 (FIG. 4) indexes the target 45. When the base plates move together in response to a compression force on the plate P, the other or left spring finger 70 positively indexes the target 45 in the same direction. As a result, the strains are scratched into or recorded on the target 45 in a generally zig-zag pattern along a generally circular path on the lower face of the target. The actuating fingers 70 are also effective to form marks on the upper face of the target 45 with each step of advancement and thereby provide a visual indication of what portion or segment of the target has been used.

Figure 6:
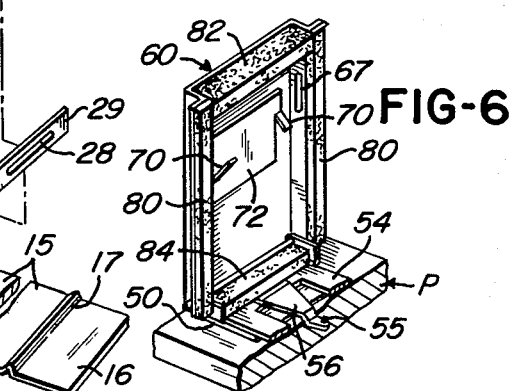
FIG. 6 is another fragmentary perspective view showing a modification of a recording instrument constructed in accordance with the invention.

Referring to FIG. 6 which shows a modification of a mechanical strain recording instrument constructed in accordance with the invention, a pair of parallel strips 80 of a resilient plastics foam material are cemented to the lower surfaces of the outwardly projecting cover flanges 66, and another strip 82 of the material is cemented to the outer end portion of the cover member 60 between the sidewall 63. A similar strip 84 of resilient foam material is cemented to the hinge plate 52 between the upwardly projecting tabs or ears 53. These strips of resilient foam material are effective to provide a dust-proof seal between the cover member 60 and the base plates 15 and 50 and the plate P when the cover member 60 is pivoted to its closed position.

From the drawing and the above description, it is apparent that a mechanical strain recording instrument constructed in accordance with the present invention, provides several desirable features and advantages. For example, the instrument provides for conveniently loading a target 45 onto the tapered support button 36 when the cover member 60 is in its open position, and also provides for conveniently removing the target after strain information has been recorded on the target. By retracting the spring latch member 26 after a target 45 is placed on the button 36, the target is retained in its proper position in relation to the stylus 55. Thus when the cover member 60 is closed, the operator is assured that the target 45 has not shifted from the support button 36 and is properly positioned. The retention of the target 45 by the latch member 26 is also desirable when the instrument is mounted on the underneath surface of a member to be monitored for strains, such as the underneath surface of an aircraft wing. That is, the latch member 26 retains the target 45 and prevents it from dropping from the support button 36 until the cover member 60 is closed and latched.

Another important advantage is provided by the pivotal cover member 60 which protects the target member 45 and stylus 55 when the cover member 60 is closed and also provides a smooth outwardly exposed surface. In addition, the optional use of the strips 80, 82 and 84 of resilient plastics foam material on the hinge plate 52 and the cover member 60, provides a simplified means for confining the target 45 and the stylus 55 within a sealed dust-proof enclosure. In addition, the tapered peripheral surface of the target support button 36 assures that there is no lateral play or movement of the target 45 relative to the support button 36 when the instrument and target 45 are subject to substantial thermal expansion and contraction.

The compressible tubular rolled-type hinge pin 58 also assures a positive pivotal connection between the cover member 60 and the base plate 50 to avoid any play between these components. The hinge pin 58 may also be conveniently removed in the event that it is desirable to replace the cover member 60 the spring actuating fingers 70 after the instrument has had extended use. The slidable connection between the tabs 54 of the hinge plate 52 and the corresponding rearward end portions of the base plate 15, is also effective to minimize angular movement between the base plates 15 and 50 when the test plate P flexes.

It is also apparent that the closing of the cover member 60 causes the fingers 70 to rotate or advance the target 45 by a slight amount. This causes the stylus 55 to produce a slight part-circular reference mark on the target 45. Such a reference mark is desirable when reading and interpreting the information marked on the target 45 and also for providing an indication when the cover member 60 was opened and closed. This reference mark is also helpful for indicating whether the instrument has been tampered with during a test.

While the forms of recording instruments herein described constitute preferred embodiments of the invention, it is to be understood that the invention is not limited to these precise forms of instruments, and that changes may be made therein without departing from the scope and spirit of the invention. For example, it is apparent that the stylus 55 and a support spring similar to the spring 56, may be mounted on the inner surface of the cover wall 62 rather than on the hinge plate 52 so that the stylus 55 would only engage the target 45 when the cover member 60 is closed.

The invention having thus been described, the following is claimed:

1. An instrument adapted for mechanically recording strains on a target, comprising first support means adapted to be attached to a member to be tested and being effective to support the target for rotation, a recording element, second support means also adapted to be attached to the member to be tested and being effective to support said recording element in engagement with the target, said recording element being movable in a generally radial direction relative to the target in response to relative linear movement between said first and second support means for producing marks on the target, actuating means for positively and incrementally rotating the target in response to said linear movement between said first and second support means, and means supporting said actuating means for pivotal movement between a first position engaging the target and a second position spaced from the target.

2. An instrument as defined in claim 1 wherein said latter supporting means comprise a cover member, means pivotally connecting said cover member to said second support means and providing for movement of said cover member between said first position overlying the target and said second position, and means for retaining said cover member in said first position.

3. An instrument as defined in claim 2 wherein said connecting means comprise aligned holes within said cover member and said second support means, and a split tubular pin extending through said holes.

4. An instrument as defined in claim 2 wherein said retaining means comprise a movable spring retainer having means for also retaining said target on said first support means.

5. An instrument as defined in claim 4 wherein said spring retainer comprises a spring wire latch member having a portion adapted to be manually engaged for moving said latch member between a first position for retaining said target and a second position for retaining said cover member and releasing said target.

6. An instrument as defined in claim 1 wherein said means for supporting the target comprise a spring-biased projection having a tapered outer surface for engaging a portion of the target defining a center hole within the target.

7. An instrument as defined in claim 1 wherein the target comprises a disc-like target having opposite faces, said actuating means comprise a set of spring fingers positioned generally diametrically in relation to the target, and said fingers are arranged to engage one of said faces of the target when said actuating means moves to said first position.

8. An instrument as defined in claim 7 wherein said second support means includes a spring element supporting said recording element in engagement with the other said face of the target.

9. An instrument as defined in claim 1 wherein said first support means comprise a generally rectangular metal base plate having a substantially flat end portion adapted to be secured by cement to the member being tested, and said base plate has a laterally extending rib portion for limiting the flow of cement on said base plate.

10. An instrument as defined in claim 2 including a resilient seal material disposed between said cover member and at least one of said support means for forming a generally dust-proof enclosure for the target and said recording element.

11. An instrument as defined in claim 10 wherein said resilient seal material comprise a plastics foam material.

12. An instrument as defined in claim 1 wherein each of said support means comprises a metal plate, one of said plates has a portion defining a slot, and the other of said plates has a portion slidably received within said slot for minimizing flexing of the instrument in response to flexing of the member being tested.

13. An instrument adapted for mechanically recording strains on a target, comprising a first base plate adapted to be attached to a member to be tested, means mounted on said first base plate for supporting the target for rotation, a recording element having a point, a second base plate also adapted to be attached to the member to be tested, means mounted on said second base plate and supporting said recording element with said point in engagement with the target, said recording element being movable in a generally radial direction relative to the target in response to relative linear movement between said first and second base plates to produce marks on target, a cover member, means for pivotally connecting said cover member to said second base plate and supporting said cover member for movement between an open position for loading a target onto said target supporting means and a closed position overlying said target, and actuating means for positively and incrementally rotating the target in response to said linear movement between said first and second base plates.

14. An instrument as defined in claim 13 wherein said actuating means is mounted on said cover member.

15. An instrument as defined in claim 13 including a latch member for alternately retaining said target on said target supporting means and for retaining said cover member to said first base plate.

16. An instrument as defined in claim 15 wherein said latch member comprises a generally U-shaped spring wire, and means for guiding said wire.

17. An instrument adapted for mechanically recording strains on a target, comprising first support means adapted to be attached to a member to be tested and being effective to support the target for rotation, a recording element having a point, second support means also adapted to be attached to the member to be tested and being effective to support said recording element with said point in engagement with the target, said recording element being effective to move in a generally radial direction relative to the target in response to relative linear movement between said first and second support means to produce marks on target, a cover member mounted on said second support means for movement between an open position for loading a target onto said first support means and a closed position overlying said target, actuating means for positively and incrementally rotating the target in response to said linear movement between said first and second support means, and said actuating means being supported by said cover member for movement therewith.

18. An instrument adapted for mechanically recording strains on a target, comprising a first base plate, a spring-biased tapered projection mounted on said first plate and adapted to support the target for rotation, a recording element having a point, a second base plate, a spring element mounted on said second base plate and supporting said recording element with said point in engagement with the target, said recording element being effective to move in a generally radial direction relative to the target in response to relative linear movement between said first and second base plates to produce marks on target, a generally rectangular cover member, pivot means connecting said cover member to said second base plate and supporting said cover member for movement between an open position for loading a target onto said projection and a closed position overlying said target, a set of spring actuating fingers mounted on said cover member and disposed to engage diametrically opposed portions of the target when said cover member is pivoted to said closed position, and said actuating fingers being effective to rotate the target in one direction in response to said linear movement between said first and second base plates in either direction.

* * * * *